US008370053B2

(12) United States Patent
Li

(10) Patent No.: US 8,370,053 B2
(45) Date of Patent: Feb. 5, 2013

(54) METHOD AND SYSTEM FOR A TRAFFIC MANAGEMENT SYSTEM BASED ON MULTIPLE CLASSES

(75) Inventor: Jing Li, Madison, WI (US)

(73) Assignee: Trafficcast International, Inc., Madison, WI (US)

( * ) Notice: Subject to any disclaimer, the term of this patent is extended or adjusted under 35 U.S.C. 154(b) by 1322 days.

(21) Appl. No.: 11/945,650

(22) Filed: Nov. 27, 2007

(65) Prior Publication Data

US 2008/0262716 A1 Oct. 23, 2008

Related U.S. Application Data

(63) Continuation of application No. 11/738,712, filed on Apr. 23, 2007.

(51) Int. Cl.

| | |
|---|---|
| ***G08G 1/00*** | (2006.01) |
| ***G08G 1/123*** | (2006.01) |
| ***G06F 19/00*** | (2006.01) |

(52) U.S. Cl. ........ 701/117; 701/118; 701/119; 701/120; 701/400; 701/411; 701/414; 701/422; 701/423; 701/425; 340/995.1; 340/995.13; 340/995.19; 340/995.22; 340/995.23; 342/454; 342/456; 705/5; 705/6; 705/13

(58) Field of Classification Search ...... 701/1, 117–120, 701/201–213, 400, 411, 414, 422, 423, 425; 340/995.1–995.13, 995.19, 995.22, 995.23; 342/454, 456; 705/1, 5, 6, 13, 400

See application file for complete search history.

(56) References Cited

U.S. PATENT DOCUMENTS

| | | | | |
|---|---|---|---|---|
| 4,350,970 | A * | 9/1982 | von Tomkewitsch | 340/989 |
| 4,931,941 | A | 6/1990 | Kirshnan | |
| 5,610,821 | A | 3/1997 | Gazis et al. | |
| 6,049,754 | A | 4/2000 | Beaton et al. | |
| 6,175,803 | B1 | 1/2001 | Chowanic et al. | |
| 6,314,361 | B1 * | 11/2001 | Yu et al. | 701/120 |
| 6,317,686 | B1 | 11/2001 | Ran | |
| 6,334,086 | B1 | 12/2001 | Park et al. | |
| 6,356,836 | B1 * | 3/2002 | Adolph | 701/208 |
| 6,546,330 | B2 | 4/2003 | Fushiki et al. | |
| 6,564,259 | B1 * | 5/2003 | Baber et al. | 709/223 |

(Continued)

OTHER PUBLICATIONS

Larry J. LeBlanc et al., "A Bilevel Programming Algorithm for Exact Solution of the Network Design Problem with User-Optimal Flows", Transpn. Res.-B, vol. 20B, No. 3, pp. 259-265, 1986.

(Continued)

*Primary Examiner* — John Q Nguyen
*Assistant Examiner* — Chuong Nguyen
(74) *Attorney, Agent, or Firm* — Foley & Lardner LLP

(57) ABSTRACT

A method of method of assigning routes for a plurality of users allocated to different classes is provided. A first group of users is identified based on a user classification, wherein each user of the first group of users has a first user classification. A second group of users is identified based on the user classification, wherein each user of the second group of users has a second user classification. The first user classification is different from the second user classification. A disutility value is calculated for each user of the first group of users and for each user of the second group of users using a travel disutility function based on an origin and a destination of each user of the first group of users and each user of the second group of users. A bi-level problem solver is executed to optimize the disutility value based on the user classification. A route is recommended for each user of the first group of users and for each user of the second group of users based on the bi-level problem execution.

18 Claims, 6 Drawing Sheets

U.S. PATENT DOCUMENTS

| | | | | |
|---|---|---|---|---|
| 6,564,260 | B1 * | 5/2003 | Baber et al. | 709/223 |
| 6,574,547 | B2 | 6/2003 | MacPhail et al. | |
| 6,580,997 | B2 | 6/2003 | MacPhail et al. | |
| 6,594,576 | B2 | 7/2003 | Fan et al. | |
| 6,609,061 | B2 | 8/2003 | MacPhail et al. | |
| 6,611,750 | B2 | 8/2003 | MacPhail et al. | |
| 6,681,175 | B2 | 1/2004 | MacPhail et al. | |
| 6,834,229 | B2 | 12/2004 | Rafiah et al. | |
| 6,882,930 | B2 | 4/2005 | Trayford et al. | |
| 6,885,935 | B2 | 4/2005 | MacPhail et al. | |
| 6,973,384 | B2 | 12/2005 | Zhao et al. | |
| 7,096,115 | B1 | 8/2006 | Groth et al. | |
| 7,191,058 | B2 | 3/2007 | Laird et al. | |
| 7,206,696 | B2 | 4/2007 | Furukawa et al. | |
| 2002/0026277 | A1 | 2/2002 | Kerner et al. | |
| 2002/0106063 | A1 | 8/2002 | Voudouris | |
| 2002/0120389 | A1 | 8/2002 | Fushiki et al. | |
| 2002/0167408 | A1 * | 11/2002 | Trajkovic et al. | 340/573.1 |
| 2002/0198995 | A1 | 12/2002 | Liu et al. | |
| 2003/0009277 | A1 | 1/2003 | Fan et al. | |
| 2003/0171870 | A1 | 9/2003 | Gueziec | |
| 2003/0225600 | A1 * | 12/2003 | Slivka et al. | 705/5 |
| 2004/0088107 | A1 | 5/2004 | Seligmann | |
| 2005/0043880 | A1 | 2/2005 | Yamane et al. | |
| 2005/0093720 | A1 | 5/2005 | Yamane et al. | |
| 2005/0192737 | A1 | 9/2005 | Zhao et al. | |
| 2005/0261829 | A1 | 11/2005 | Furukawa et al. | |
| 2005/0261830 | A1 | 11/2005 | Furukawa | |
| 2005/0288856 | A1 | 12/2005 | Uyeki et al. | |
| 2006/0031007 | A1 | 2/2006 | Agnew et al. | |
| 2006/0058940 | A1 | 3/2006 | Kumagai et al. | |
| 2006/0069496 | A1 | 3/2006 | Feldman et al. | |
| 2006/0074546 | A1 | 4/2006 | DeKock et al. | |
| 2006/0082472 | A1 | 4/2006 | Adachi et al. | |
| 2006/0111833 | A1 | 5/2006 | Feldman et al. | |
| 2006/0161335 | A1 | 7/2006 | Beinhaker | |
| 2006/0168592 | A1 | 7/2006 | Andrews et al. | |
| 2006/0178806 | A1 | 8/2006 | Liu et al. | |
| 2006/0241855 | A1 | 10/2006 | Joe et al. | |
| 2006/0241856 | A1 | 10/2006 | Cobleigh et al. | |
| 2006/0247852 | A1 | 11/2006 | Kortge et al. | |
| 2006/0287818 | A1 | 12/2006 | Okude et al. | |
| 2006/0293046 | A1 | 12/2006 | Smith | |
| 2007/0005228 | A1 | 1/2007 | Sutardja | |
| 2007/0106461 | A1 | 5/2007 | Zhao et al. | |
| 2007/0118280 | A1 | 5/2007 | Uhlmann et al. | |
| 2007/0129880 | A1 | 6/2007 | Thacher | |

OTHER PUBLICATIONS

Bin Ran et al., "Modeling Dynamic Transportation Networks, an Intelligent Transportation System Oriented Approach", Feb. 1996.

Aoyama, "Universal Traffic Management System (UTMS) in Japan", *Vehicle Navigation & Information Systems Conference Proceedings*, 1994, pp. 619-622.

Shibata et al., "A Method for Sharing Traffic Jam Information using Inter-Vehicle Communication", IEEE, 2006.

Hsieh et al., "Automatic Traffic Surveillance System for Vehicle Tracking and Classification", *IEEE Transactions on Intelligent Transportation Systems*, vol. 7, No. 2, Jun. 2006, pp. 175-187.

Yang et al., "Intelligent In-Vehicle Control and Navigation based on Multi-Route Traffic Optimization", *Proceedings of the Fifth International Conference on machine Learning and Cybernetics*, Dalian, Aug. 13-16, 2006, pp. 962-966.

* cited by examiner

METHOD AND SYSTEM FOR A TRAFFIC MANAGEMENT SYSTEM BASED ON MULTIPLE CLASSES

CROSS-REFERENCE TO RELATED PATENT APPLICATIONS

This application is a Continuation of U.S. patent application Ser. No. 11/738,712, filed Apr. 23, 2007, the disclosure of which is incorporated herein by reference in its entirety.

FIELD

The field of the disclosure relates generally to traffic management systems. More specifically, the disclosure relates to a traffic management system that allocates traffic routes based on multiple tiers of user classification.

BACKGROUND

Currently, various types of information service providers (ISPs) provide traffic information to users. The various types of ISPs include traffic and map systems such as Westwood One, Traffic.com/Navteq, Clear Channel Traffic; portal systems such as Yahoo!, Google, MapQuest/AOL, MicroSoft MSN; wireless carriers such as Verizon Wireless, Cingular Wireless, Sprint Nextel, T-Mobile; telematics and navigation systems—GM OnStar, Ford, Toyota, XM Satellite Radio, Sirius Satellite Radio, Garmin, TomTom, Magellen, Motorola, AAA; and media companies such as NBC, ABC, CBS, etc. With the improvement in the quality and the granularity of traffic and travel time information, ISPs attempt to provide route-specific travel time information and dynamic route guidance information to individual users to influence the individual's travel choices including departure time, arrival time, route, destination, etc. An individual traveler relies on the ISP's information and personal experiences and preferences to make individual decisions for their travel choices.

As ISPs provide route-specific travel time information and dynamic route guidance information to more and more individual users, market penetration of actionable traffic information services may increase rapidly. As this type of actionable traffic information provision market penetration reaches a critical threshold, users with similar traffic and travel time information may compete for the shortest travel time routes creating new congestion for these routes. For example, users in the San Francisco Bay Area typically choose US 101 to travel from San Francisco to San Jose. When severe congestion occurs on US 101, for example, due to a major traffic accident, many ISPs advise motorists to use alternate routes I-280 or El Camino Real to avoid major congestion on US 101. However, with the diversion of a large number of users from US 101 to I-280 or El Camino Real these routes quickly become congested.

As the market penetration of personalized traffic and travel time information becomes higher and higher, customers of different ISPs may compete for limited roadways to find the quickest routes to their destinations. Such unregulated competition among ISPs and individual users results in the unnecessary waste of societal resources such as fuel and time, and increases the uncertainty of travel times for individual users' trips. Current traffic information dissemination is fragmented and not coordinated or connected because the many parties involved compete and do not communicate. Furthermore, no feedback process is provided between a motorist and an ISP. Thus, what is needed is a method and a system for the coordinated allocation of traffic routes. What is additionally needed is a method and a system for allocating traffic routes with consideration of route congestion.

SUMMARY

A method and a system for the coordinated allocation of traffic routes is provided in an exemplary embodiment. For an ISP, a traffic and travel time information system provides tiered traffic and travel time information to different classes of users so that higher classes of users obtain higher quality and higher valued traffic and travel time information to enable faster travel or to reduce congestion. Additionally, for an urban area, a system coordinator coordinates the provision of traffic and travel time information to individual users across multiple ISPs.

In another exemplary embodiment, a method of assigning routes for a plurality of users allocated to different classes is provided. A first group of users is identified based on a user classification, wherein each user of the first group of users has a first user classification. A second group of users is identified based on the user classification, wherein each user of the second group of users has a second user classification. The first user classification is different from the second user classification. A disutility value is calculated for each user of the first group of users and for each user of the second group of users using a travel disutility function based on an origin and a destination of each user of the first group of users and each user of the second group of users. A bi-level problem solver is executed to optimize the disutility value based on the user classification. A route is recommended for each user of the first group of users and for each user of the second group of users based on the bi-level problem execution.

In an exemplary embodiment, a device for assigning routes for a plurality of users allocated to different classes is provided. The device includes, but is not limited to, a computer-readable medium having computer-readable instructions stored thereon, a communication interface, and a processor. The computer-readable instructions implement the operations of the method of assigning routes for a plurality of users allocated to different classes. The communication interface sends the recommended route to each user of the first group of users and to each user of the second group of users. The processor is coupled to the communication interface and to the computer-readable medium and is configured to execute the instructions.

In yet another exemplary embodiment, a computer-readable medium is provided. The computer-readable medium has computer-readable instructions therein that, upon execution by a processor, cause the processor to implement the operations of the method of assigning routes for a plurality of users allocated to different classes.

Other principal features and advantages of the invention will become apparent to those skilled in the art upon review of the following drawings, the detailed description, and the appended claims.

BRIEF DESCRIPTION OF THE DRAWINGS

Exemplary embodiments of the invention will hereafter be described with reference to the accompanying drawings, wherein like numerals denote like elements.

DETAILED DESCRIPTION

Figure 1:
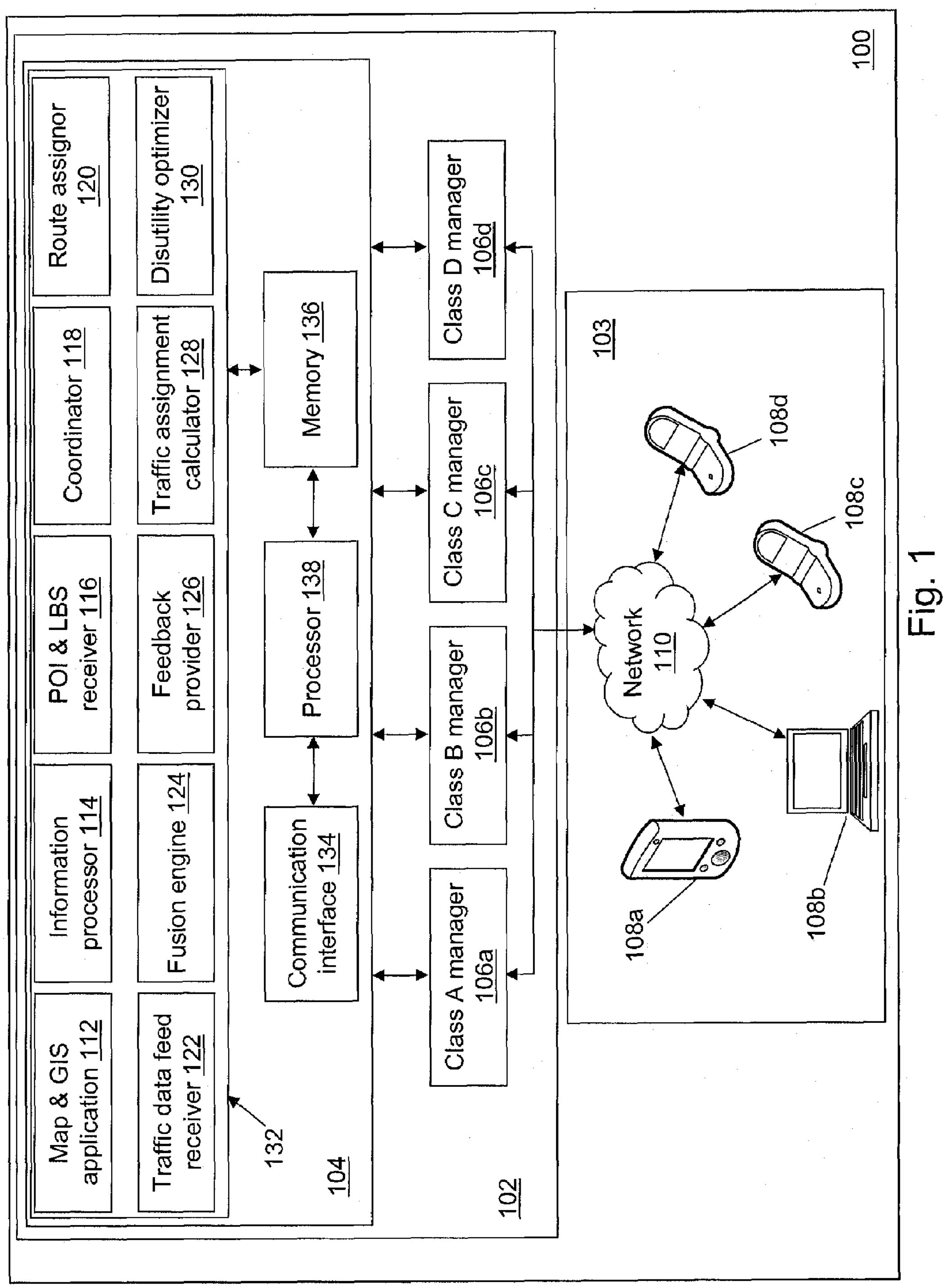
FIG. 1 depicts a block diagram of a traffic management system in accordance with a first exemplary embodiment.

With reference to FIG. 1, a traffic management system 100 is provided in accordance with an exemplary embodiment. Traffic management system 100 provides a travel time and traffic information provision system for a traffic information service provider (ISP). In the exemplary embodiment of FIG. 1, traffic management system 100 comprises a class management system 102 and a user network 103. Class management system 102 allocates traffic route information for users of user network 103. Class management system 102 may include a plurality of class managers and a master class manager 104. For example, with reference to the exemplary embodiment of FIG. 1, the plurality of class managers include a class A manager 106*a*, a class B manager 106*b*, a class C manager 106*c*, a class D manager 106*d*. A class manager 106 (shown in more detail with reference to FIG. 2) manages and coordinates the provision of travel time and traffic information to a plurality of user classes of user network 103 who access the same types of traffic and travel time information services.

Class management system 102 may comprise one or more computing devices which perform the functionality described. If class management system 102 is comprised of a plurality of computing devices, the computing devices may communicate using one or more network. Class management system 102 optimizes the travel time and traffic information provision for a plurality of user classes, while coordinating the interaction and feedback of different user classes.

Master class manager 104 manages and coordinates the processing of the plurality of class managers in providing traffic information for each class of users. Master class manager 104 optimizes the provision of traffic and travel time information services based on business objectives, user needs, raw traffic data provided by third party traffic data providers and coordinates the interaction of the plurality of user classes to optimize the travel time and traffic information provision for each class of users based on the provision of traffic information and user compliance and feedback. Master class manager 104 optimizes the provision of traffic and travel time information services to serve each class of users according to their classification and priority ranking under traffic congestion caused by: (1) users without a subscription to the ISP's information services, (2) users served by the ISP, and (3) users served by other ISPs. A bi-level dynamic travel decision making problem finds the optimal travel time and dynamic routing solutions for traffic management system 100. Specifically, for each class j users at any time interval, the objective of master class manager 104 is to minimize a travel disutility between each origin-destination, i.e. to minimize $$\pi_j^{rs}(t) \tag{1}$$

$$\text{subject to } \pi_j^{rs}(t) \geqq \pi_{j-1}^{rs}(t) \forall r,s,j \tag{2}$$

$$\text{and } \pi_{ij}^{rs}(t) \geqq \pi_j^{rs}(t) \forall r,s,i,j \tag{3}$$

if the ISP chooses or recommends routes for a traveler i at time t, $$\pi_{ij}^{rs}(t) = \pi_j^{rs}(t) \forall r,s,i,j \tag{4}$$

and network flow constraints where $\pi_{ij}^{rs}(t)$ is the travel disutility for traveler i in class j departing origin r at time t toward destination s and $\pi_j^{rs}(t)$ is the minimum travel disutility for users in class j departing origin r at time t toward destination s.

As noted in equation (2), the travel disutility for class j is greater than or equal to the travel disutility for class j−1 (j=2, 3, 4, . . . , N) such that class 1 users have the lowest travel disutility among all classes. As noted in equations (3)-(4), when the ISP finds and suggests a route for traveler i in class j, the travel disutility for traveler i is equal to the travel disutility for all users in class j receiving a best route recommendation from the ISP. For example, if travel disutility is simply represented by travel time, equation (2) ensures that class 1 users have the lowest travel time routes, and class 2 users have lower travel time routes than class 3 users, etc. Equations (3)-(4) ensure that all users in class 1 receive dynamic routing suggestions which have equal and minimum travel times.

Additionally, for users in class j at any time interval, master class manager 104 minimizes the travel disutility between each origin-destination, i.e., to minimize $$\pi_{ij}^{rs}(t) \tag{5}$$

$$\text{subject to } \pi_{ijp}^{rs}(t) \geqq \pi_{ij}^{rs}(t) \forall r,s,i,j,p \tag{6}$$

if the ISP chooses or recommends routes p for a traveler i at time t, $$\pi_{ijp}^{rs}(t) = \pi_{ij}^{rs}(t) \forall r,s,i,j,p \tag{7}$$

and network flow constraints where $\pi_{ijp}^{rs}(t)$ is the travel disutility for traveler i in class j departing origin r at time t toward destination s via route p and $\pi_{ij}^{rs}(t)$ is the minimum travel disutility for users i in class j departing origin r at time t toward destination s. As noted in equations (6)-(7), when the ISP finds and suggests a route p for user i in class j, the travel disutility on route p for user i is equal to the minimum travel disutility from origin r to destination s at time interval t.

A variety of methods may be used to determine a set of solutions for equations (1)-(7) for a plurality of users allocated among a plurality of classes. For example, the methods described in LeBlanc, L and Boyce, D. E., A BILEVEL PROGRAMMING ALGORITHM FOR EXACT SOLUTION OF THE NETWORK DESIGN PROBLEM WITH USER-OPTIMAL FLOWS, Transpn. Res.-B, Vol. 20B, No. 3, pp. 259-265, 1986 could be used to solve equations (1)-(7). Simulation models can be used to solve equations (1)-(7) also. Moreover, a hybrid approach using both analytic and simulation models could be used to solve (1)-(7).

Figure 9:
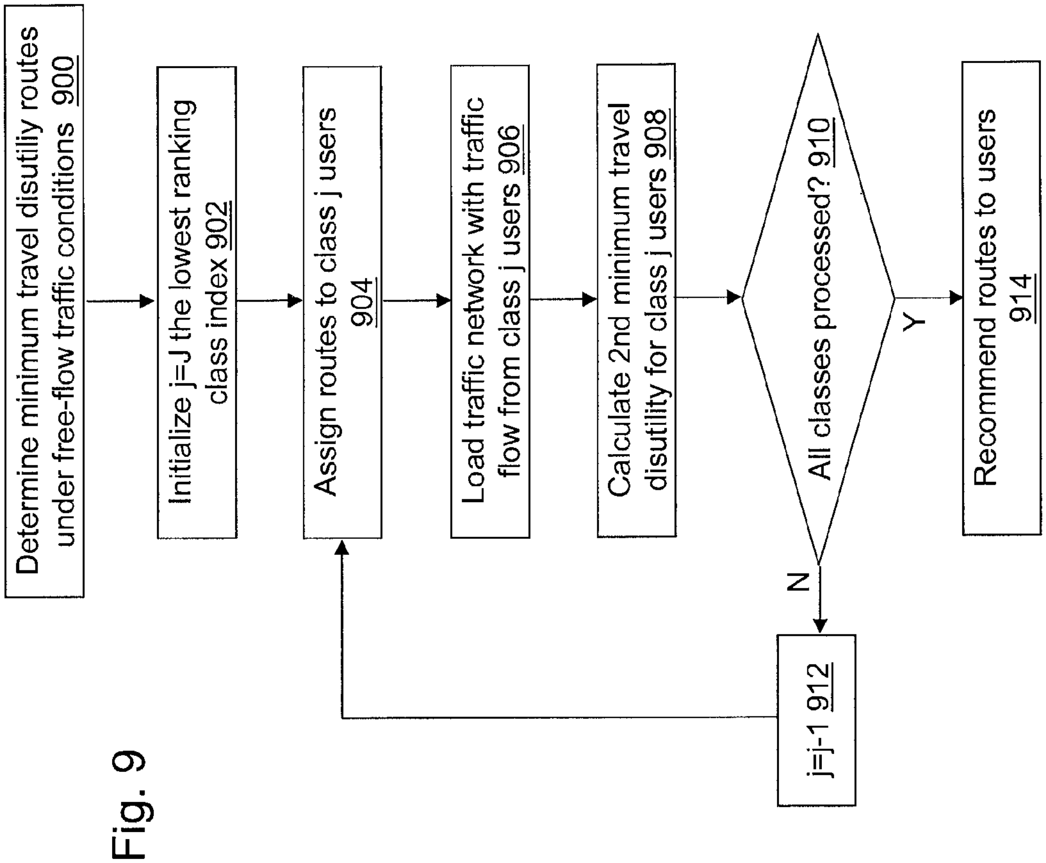
FIG. 9 depicts a flow diagram illustrating exemplary operations performed by the traffic management system of FIG. 1 in accordance with an exemplary embodiment.

With reference to FIG. 9, exemplary operations associated with determining a set of solutions for equations (1)-(7) for a plurality of users allocated among a plurality of classes are described. Additional, fewer, or different operations may be performed, depending on the embodiment. Additionally, the order of presentation of the operations of FIG. 9 is not intended to be limiting. In an operation 900, first minimum travel disutility routes between each origin-destination pair are determined based on free-flow traffic conditions producing the initial minimum travel disutility $\overline{\pi}_{ij}^{rs}(t)$ for each class j (j=1, 2, . . . , J) and each traveler i and the initial minimum travel disutility $\overline{\pi}_{j}^{rs}(t)$ for each class j. To consider incremental traffic flow loading, in an operation 902, a class counter j is initialized to J the lowest ranking class index. In an operation 904, minimum travel disutility routes are assigned to class j (j=J, J−1, . . . , 1) users. In an operation 906, the traffic network is loaded with traffic flows generated by the assignment of routes to class j users as known to those skilled in the art. In an operation 908, second minimum travel disutility routes are determined between each origin-destination pair based on the latest traffic conditions after loading the traffic flows generated by class j (j=J, J−1, . . . , 2) users. In an operation 910, a determination is made concerning whether or not all classes have been processed. If all classes have not been processed, in an operation 912, the class counter j is decremented, and processing continues at operation 904. If all classes have been processed, processing continues at an operation 914. Operations 904-912 produce an updated minimum travel disutility $\overline{\pi}_{ij}^{rs}(t)$ for class j−1 (j=J, J−1, . . . , 2) and each traveler i and an updated minimum travel disutility $\overline{\pi}_{j}^{rs}(t)$ for each class j−1 (j=J, J−1, . . . , 2). In operation 914, the resulting minimum travel disutility $\overline{\pi}_{ij}^{rs}(t)$ for class j (j=J, J−1, . . . , 1) and each traveler i and the updated minimum travel disutility $\overline{\pi}_{j}^{rs}(t)$ for each class j (j=J, J−1, . . . , 1) are used to recommend routes to the travelers.

Several approaches may be used to improve the accuracy of the solution procedure discussed with reference to FIG. 9. One example approach is to design multiple sub-classes for each class of users and to implement the operations of 900-914 for a larger number of sub-classes of users. The more sub-classes used, the higher the accuracy the solution procedure tends to produce. For example, an ISP may have only two classes of users. For computational purposes, each class of users may be further classified into five sub-classes resulting in ten sub-classes of users used in the above incremental traffic flow loading. After completion of operation 914, the results for sub-classed 1-5 may be averaged to represent the results for class 1, and the results for sub-classed 6-10 may be averaged to represent the results for class 2.

As shown in FIG. 1, master class manager 104 may include a plurality of sub-modules 132, a communication interface 134, a memory 136, and a processor 138. Different and additional components may be incorporated into master class manager 104. For example, master class manager 104 may include a display and/or an input interface to facilitate user interaction with the plurality of sub-modules 132. Communication interface 134 provides an interface for receiving and transmitting data between devices using various protocols, transmission technologies, and media as known to those skilled in the art. The communication interface may support communication using various transmission media that may be wired or wireless. Master class manager 104 may include a plurality of communication interfaces that use the same or a different transmission technology and/or transmission media. For example, if master class manager 104 and the plurality of class managers are implemented in different computing devices, communication interface may support the exchange of data between master class manager 104 and the plurality of class managers.

Memory 136 is an electronic holding place or storage for information so that the information can be accessed by processor 138 as known to those skilled in the art. Master class manager 104 may include one or more memories that use the same or a different memory technology. Memory technologies include, but are not limited to, any type of RAM, any type of ROM, any type of flash memory, etc. Master class manager 104 also may includes one or more drives that support the loading of a memory media such as a compact disk or digital video disk.

Processor 138 executes instructions as known to those skilled in the art. The instructions may be carried out by a special purpose computer, logic circuits, or hardware circuits. Thus, processor 138 may be implemented in hardware, firmware, software, or any combination of these methods. The instructions may be written using one or more programming language, scripting language, assembly language, etc. Processor 138 executes an instruction, meaning that it performs the operations called for by that instruction. Processor 138 operably couples with communication interface 134 and with memory 136 to receive, to send, and to process information. Processor 138 may retrieve a set of instructions from a permanent memory device and copy the instructions in an executable form to a temporary memory device that is generally some form of RAM. Master class manager 104 may include a plurality of processors that use the same or a different processing technology.

The plurality of sub-modules 132 may be implemented using one or more computing device. If the plurality of sub-modules 132 are implemented in different computing devices, each computing device may include a communication interface, memory, and/or processor. Thus, the plurality of sub-modules 132 may be implemented in a single computing device, in a single location, in a single facility, and/or may be remote from one another. The plurality of sub-modules 132 may include a map and geographic information system (GIS) application 112, an information processor 114, a point of interest (POI) and location based service (LBS) information receiver 116, a coordinator 118, a route assignor 120, a traffic data feed receiver 122, a traffic data fusion engine 124, a feedback provider 126, a traffic assignment calculator 128, and a disutility optimizer 130. The plurality of sub-modules 132 perform operations associated with optimizing the provision of traffic and travel time information services based on the class of each user. The operations may be implemented using hardware, firmware, software, or any combination of these methods.

Map and GIS application 112 provides a digital map database and the GIS tools for the data manipulation of traffic data, POI data, and LBS information. information processor 114 handles the information processing specific for the ISP, including information coverage, update frequency, and background information. POI and LBS information receiver 116 receives time-sensitive and location-sensitive POI and LBS information from third parties. Coordinator 118 manages the interaction of Master class manager 104 with the plurality of class managers. Route assignor 120 generates personalized, route-specific traffic information and time-dependent best routes for individual users. For example, if there are 100 class A users who desire to travel from Point A to Point B at 8 a.m. on a Tuesday, after traffic assignment calculator 128 completes its calculation and generates two best time-dependent routes between Point A and Point B for class 1 users at 8 a.m., route assignor 120 assigns the two best time-dependent routes to 100 class 1 users and generates personalized dynamic routing and travel time information for each of the 100 users. Route 1 may receive 40 users and Route 2 may receive 60 users. Such an assignment applies the embedded dynamic user-optimal routing criteria so as to avoid creating additional congestion on the two best time-dependent routes.

Traffic data feed receiver 122 receives one or more raw traffic data feeds. Fusion engine 124 fuses the traffic data received from the one or more raw traffic data feeds and creates a customized traffic database appropriate for its own applications such as applications in trip planning, en-route dynamic routing, and dynamic navigation in areas such as web, mobile, telematics, media, fleet, and government. Feedback provider 126 generates feedback information related to data quality and user responses to the route assignments. Traffic assignment calculator 128 solves equations (1)-(7) of the bi-level problem and computes the best time-dependent routes for each class of users at each time interval. The time interval may be defined as increments of one second and can range from one second to five minutes or longer. Disutility optimizer 130 generates an optimal travel disutility based on user input and the ISP's default parameters and is used in conjunction with traffic assignment calculator 128.

For class i, master class manager 104 further uses a set of route-based dynamic route choice decision tools and models to assign and disperse users onto equal travel disutility routes at each decision time instant. The assignment and dispersion spreads traffic congestion over feasible routes between each origin-destination. When a traveler navigates through traffic congestion, they can receive updated best route information based on travel disutility updates at each time interval.

The plurality of class managers minimize the travel disutility or travel times for each traveler in that class under the constraint of congestion caused by other vehicles. The travel disutility for traveler i may be defined as a function of one or more of the following factors: travel time, travel cost, travel distance, personal preference, comfort, convenience, safety, security, ISP information accuracy, ISP information reliability, ISP information update frequency, etc. Personal preference represents a traveler's preference, for example, for driving on a highway versus arterial roads. Convenience represents the impact of a route-specific POI and LBS. Safety may relate to a possibility of a wreck; whereas security may relate to a possibility of a crime. To represent social responsibility and equity, the consideration of high-occupancy vehicles may be considered. For an ISP that considers social responsibility, a high-occupancy vehicle may be classified into a higher level class when compared to other vehicles having similar conditions.

An example function of travel disutility is a linear weighted average of the above factors defined as $disutility(i)=a_1*travel\_time(i)+a_2*travel\_cost(i)+a_3*travel\_Distance(i)+a_4*personal\_preference(i)+a_5*comfort(i)+a_6*convenience(i)+a_7*safety(i)+a_8*security(i)+a_9*ISP\_information\_accuracy(i)+a_{10}*ISP\_information\_reliability(i)+a_{11}*ISP\_information\_update\_frequency(i)+a_{12}*other\_factors(i)$ where $a_j$ is the weighting factor for traveler i, j=1, 2, . . . , 12. The travel disutility for traveler i can be determined by traveler i based on the formulae provided by an ISP. The travel disutility information can be stored on a computing device, such as an in-vehicle navigation system, a mobile device such as a wireless phone, a computer of any form factor including a desktop, laptop, and pocket computer, an Apple™ iPod, etc. Additionally, the travel disutility information can be stored on a server managed by the ISP or a password protected public site. A user may update the travel disutility function and conduct calibration of the travel disutility function based on personal driving and travel experiences.

Class A manager 106*a*, class B manager 106*b*, class C manager 106*c*, and class D manager 106*d* are classified based on the user classifications defined for the ISP. For example, class A manager 106*a* may be associated with users assigned to a class A membership. The user classification may be determined, for example, based on a subscription fee paid by a user, a transaction fee paid by a user, a length of membership, a sponsorship, an advertisement income, a sponsorship of the user, a seniority ranking, and a service provider as well as other valuable consideration related to the user's membership with an ISP. A higher class of users receives a class of travel time and traffic information service having a lower travel disutility or a higher value than a lower class of users. Class A manager 106*a*, class B manager 106*b*, class C manager 106*c*, and class D manager 106*d* may be integrated in the same or different computing devices.

User network 103 may include a plurality of user devices and a network 110. In the exemplary embodiment of FIG. 1, the plurality of user devices include a pocket computer 108*a*, a laptop 108*b*, a first wireless phone 108*c*, and a second wireless phone 108*d* which communicate with class management system 102. A user of traffic management system 100 accesses the functionality provided by traffic management system 100 using the user device that may be integrated into a vehicle. Thus, each user device of the plurality of user devices may include an in-vehicle navigation system, a wireless phone, a computer of any form factor including a laptop, a pocket computer, and a personal digital assistant, a personal navigation device, an Apple™ iPod, etc. Network 110 may be wired or wireless.

Figure 2:
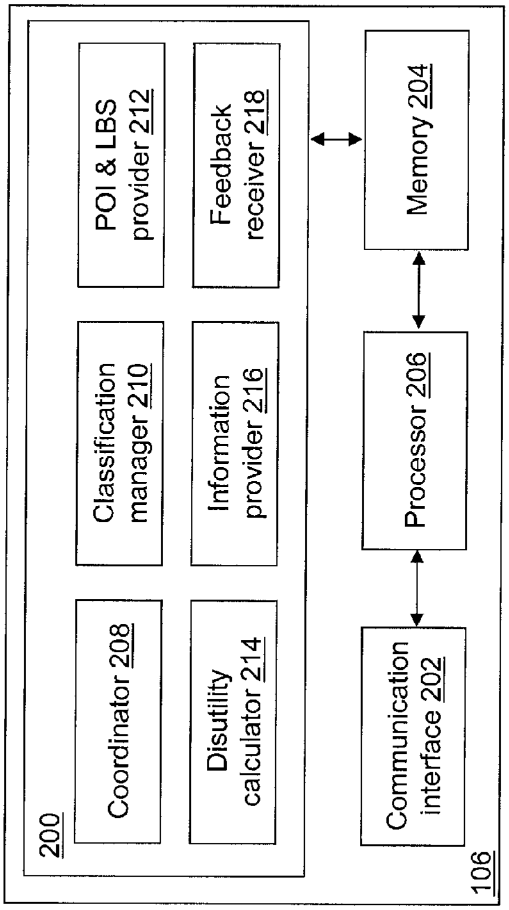
FIG. 2 depicts a block diagram of a class manager of the traffic management system of FIG. 1 in accordance with an exemplary embodiment.

With reference to FIG. 2, a class manager 106 may include a plurality of sub-modules 200, a communication interface 202, a memory 204, and a processor 206. Class A manager 106*a*, class B manager 106*b*, class C manager 106*c*, and class D manager 106*d* are each examples of class manager 106. Different and additional components may be incorporated into class manager 106. If class manager 106 is integrated with master class manager 104, one or more of communication interface 202, memory 204, and processor 206 of class manager 106 may be the same as communication interface 134, memory 136, and processor 138. In the exemplary embodiment of FIG. 1, class A manager 106*a*, class B manager 106*b*, class C manager 106*c*, and class D manager 106*d* may be integrated into the same computing device or implemented at different computing devices. As a result, class manager 106 may or may not include communication interface 202, memory 204, and processor 206.

The plurality of sub-modules 200 may include a coordinator 208, a classification manager 210, a POI and LBS information provider 212, a disutility calculator 214, an information provider 216, and a feedback receiver 218. Coordinator 208 interacts with master class manager 104. Classification manager 210 handles user registration information and classifies users based on the ISP's rules. POI and LBS information provider 212 overlays personalized, route-specific POI and LBS information for user-selected routes in combination with disutility calculator 214 and information provider 216.

Disutility calculator 214 is used to personalize travel disutility based on the traveler's personal experiences and personal preferences. For example, aggressive young drivers may prefer freeways over arterials. As a result, their personalized travel disutility for freeway routes is lower than for senior drivers who tend to drive more slowly. A traveler uses their self-defined travel disutility to make travel choice decisions. Information provider 216 provides personalized, route-specific travel time and traffic information for individual users. Feedback receiver 218 receives feedback information from individual users. For a traveler, the feedback information may include the actual route taken by the traveler and compliance information of the traveler with the dynamic routing information provided by the ISP. Thus, a traveler may choose not to follow the routes that the ISP recommends.

Figure 3:
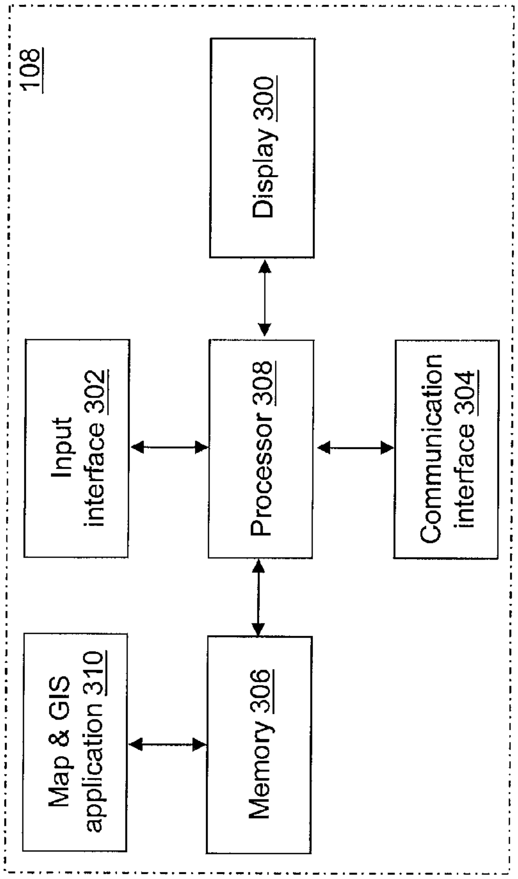
FIG. 3 depicts a block diagram of a user device in accordance with an exemplary embodiment.

With reference to FIG. 3, a user device 108 used to interact with class management system 102 may include a display 300, an input interface 302, a communication interface 304, a memory 306, a processor 308, and a map and GIS application 310. Pocket computer 108*a*, laptop 108*b*, first wireless phone 108*c*, and second wireless phone 108*d* are each examples of user device 108. Exemplary user devices include an in-vehicle navigation system, a wireless phone, a computer of any form factor including a laptop, a pocket computer, and a personal digital assistant, a personal navigation device, an Apple™ iPod, etc. Different and additional components may be incorporated into user device 108. User device 108 may further include a disutility calculator that can be utilized by the user instead of disutility calculator 214 (shown with reference to FIG. 2). In other words, the traveler may store their self-defined travel disutility on user device 108. User device 108 may be integrated into a vehicle or may be mobile. Display 300 presents information to a user of user device 108 as known to those skilled in the art. For example, display 300 may be a thin film transistor display, a light emitting diode display, a liquid crystal display, or any of a variety of different displays known to those skilled in the art.

Input interface 302 provides an interface for receiving information from the user for entry into user device 108 as known to those skilled in the art. Input interface 302 may use various input technologies including, but not limited to, a keyboard, a pen and touch screen, a mouse, a track ball, a touch screen, a keypad, one or more buttons, voice, etc. to allow the user to enter information into user device 108 or to make selections presented in a user interface displayed on display 300. Input interface 302 may provide both an input and an output interface. For example, a touch screen both allows user input and presents output to the user.

Communication interface 304 provides an interface for receiving and transmitting data between user device 108 and class management system 102 using various protocols, transmission technologies, and media as known to those skilled in the art. The communication interface may support communication using various transmission media that may be wired or wireless. User device 108 may include a plurality of communication interfaces that use the same or a different transmission technology and/or transmission media. Memory 306 is an electronic holding place or storage for information so that the information can be accessed by processor 308 as known to those skilled in the art. User device 108 may include one or more memories that use the same or a different memory technology. Processor 308 executes instructions as known to those skilled in the art. The instructions may be carried out by a special purpose computer, logic circuits, or hardware circuits. Thus, processor 308 may be implemented in hardware, firmware, software, or any combination of these methods. The term "execution" is the process of running an application or the carrying out of the operation called for by an instruction. The instructions may be written using one or more programming language, scripting language, assembly language, etc. Processor 308 executes an instruction, meaning that it performs the operations called for by that instruction. Processor 308 operably couples with display 300, input interface 302, communication interface 304, and memory 306 to receive, to send, and to process information. Processor 308 may retrieve a set of instructions from a permanent memory device and copy the instructions in an executable form to a temporary memory device that is generally some form of RAM. User device 108 may include a plurality of processors that use the same or a different processing technology.

Map and GIS application 310 performs operations associated with presentation of a map and routes using a digital map database and GIS tools for the data manipulation of traffic data, POI data, and LBS information. The operations may be implemented using hardware, firmware, software, or any combination of these methods. With reference to the exemplary embodiment of FIG. 3, map and GIS application 310 is implemented in software stored in memory 306 and accessible by processor 308 for execution of the instructions that embody the operations of map and GIS application 310. Map and GIS application 310 may be written using one or more programming languages, assembly languages, scripting languages, etc. In an exemplary embodiment, user device 108 may interact with information provider 216 (shown with reference to FIG. 2) to receive the personalized, route-specific traffic and travel time information which may be displayed to the user using map and GIS application 310 on display 300. Alternatively, the user may use map and GIS application 310 to make their dynamic travel decisions.

The operations of traffic management system 100 can be explained using an example. A traveler subscribes to a travel time and traffic information service of the ISP. Class manager 106 uses classification manager 210 to collect basic demographic information and personal preference information associated with the traveler. Disutility calculator 214 customizes parameters based on the input of the traveler to calculate a personalized travel disutility. Coordinator 208 of class manager 106 sends user information to master class manager 104 for further processing. Coordinator 118 of master class manager 104 receives the user information from Coordinator 208 of class manager 106. Traffic assignment calculator 128 of master class manager 104 uses the user information and information from other users to estimate and predict the best travel time and routing decisions for all classes of users. Route assignor 120 produces dynamic routing information for each class of users. Information provider 216 of class manager 106 presents the user with personalized, route-specific travel time and traffic information as well as dynamic routing information. POI and LBS information provider 212 of class manager 106 adds related POI and LBS information for the best routes assigned to the user. The user uses their user device 108 to receive the personalized, route-specific travel time and traffic information from information provider 216 of class manager 106. Any feedback from the traveler is received by feedback receiver 218 of class manager 106. Because the user may or may not rely on the travel time and traffic information as well as dynamic routing information from information provider 216 of class manager 106 to make their own travel decisions, feedback is useful for traffic assignment calculator 128 of master class manager 104 to make a better estimation and prediction for travel time and coordinated routing.

For an urban area in particular, it is beneficial and more efficient for a single super ISP (SISP) to coordinate the traffic and travel time information provision among a plurality of ISPs and for a majority of the users. Consequently, all classes of users from all ISPs associated with the SISP have similar coordination of travel time, traffic, and dynamic routing information provision, although at its own discretion, each ISP may provide different travel time, traffic, and dynamic routing information services bundled with other location sensitive information. For the SISP, all users are considered in one pool in classification and travel time, traffic, and dynamic routing information provision.

Figure 4:
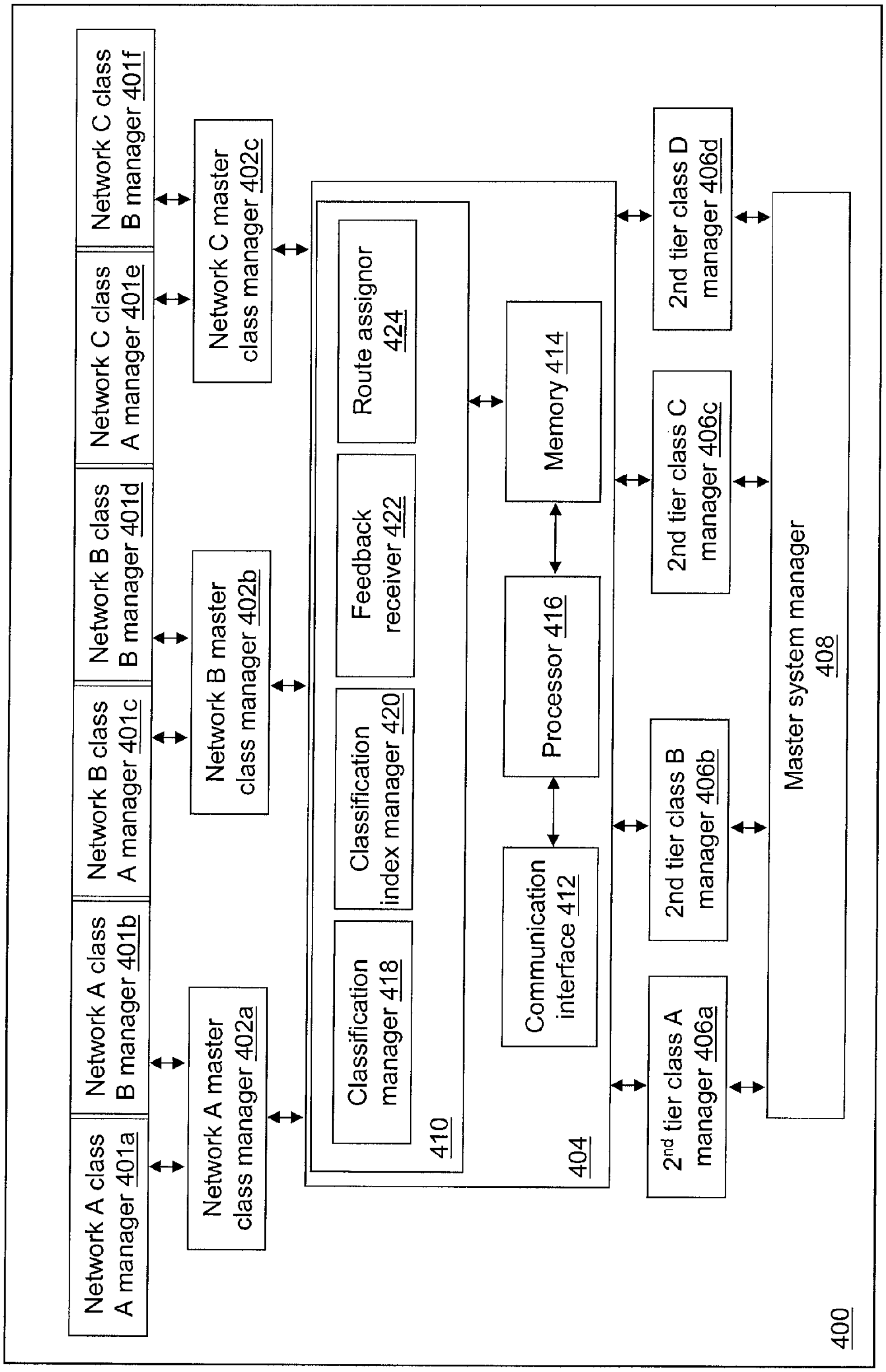
FIG. 4 depicts a block diagram of a traffic management system in accordance with a second exemplary embodiment.

With reference to FIG. 4, a hierarchical traffic management system 400 for a SISP is shown in accordance with an exemplary embodiment. For a region or a country, multiple ISPs exist and compete for users who typically drive on the same roadways in the same region or city. Competing ISPs may provide the same best travel disutility routes to their users so that many users may end up choosing the same routes at the same time interval, thus generating new congestion on routes which recently were determined to have the lowest travel disutility. This type of competition among ISPs and information provision methods does not serve users well, reduces the credibility of ISPs, causes an unnecessary waste of resources, and increases the societal costs. A coordinated approach among competing ISPs provides a balanced traffic and travel time information provision approach that disperses traffic among various types of congested routes.

Hierarchical traffic management system 400 includes multiple class management tiers that interact to provide a balanced traffic and travel time information provision approach that disperses traffic among various types of congested routes. Hierarchical traffic management system 400 may include a plurality of network class managers, a plurality of network master class managers, a second tier coordinator 404, a plurality of second tier class managers, and a master system manager 408. Master system manager 408 manages and coordinates the acts of the plurality of second tier class managers, which generate and manage traffic and travel time information for each class of users. Master system manager 408 optimizes the overall offering of traffic, travel time, and dynamic routing information services for all ISPs and all users based on collective business objectives of all associated ISPs, user needs, raw traffic data provided by third party traffic data providers. Master system manager 408 coordinates the interaction of the plurality of second tier class managers to optimize the travel time and dynamic routing information provision for the class of users based on traffic information provision and user compliance and feedback. The plurality of second tier class managers manage and coordinate the provision of travel time and dynamic routing information to a plurality of classes of users generating the same type of travel time and dynamic routing information for the same class of users. Second tier coordinator 404 manages and coordinates the provision of traffic, travel time, and dynamic routing information to a plurality of ISPs, regardless of the ISP to which a user belongs. Second tier coordinator 404 coordinates the interaction of all associated ISPs and all users in order to optimize the travel time, traffic, and dynamic routing information provision for the class of users based on compliance and feedback from all users of all associated ISPs.

The objective of master system manager 408 is to optimize the information provision of traffic, travel time, and dynamic routing information to serve each class of users according to their classification and priority ranking within the SISP. In such a context, the traffic congestion under consideration is caused by: (1) background traffic served by ISPs associated with the SISP, (2) background traffic served by ISPs not associated with the SISP, and (3) background traffic not served by any ISP. For example, Google™, GM OnStar®, Verizon Wireless, MicroSoft®, and Garmin™ may be the ISPs associated with the SISP for a city. Each ISP has its own classification of users and each ISP submits its classification and pricing scheme to the SISP. The SISP pools the classes of users from all of the ISPs and defines its own classification scheme.

In the exemplary embodiment of FIG. 4, the plurality of network class managers include a network A class A manager 401*a*, a network A class B manager 401*b*, a network B class A manager 401*c*, a network B class B manager 401*d*, a network C class A manager 401*e*, and a network C class B manager 401*f*. Network A class A manager 401*a* and network A class B manager 401*b* may be associated with a first ISP or network A of users and may be integrated in the same or different computing devices. Network B class A manager 401*c* and network B class B manager 401*d* may be associated with a second ISP or network B of users and may be integrated in the same or different computing devices. Network C class A manager 401*e* and network C class B manager 401*f* may be associated with a third ISP or network C of users and may be integrated in the same or different computing devices.

In the exemplary embodiment of FIG. 4, the plurality of network master class managers include a network A master class manager 402*a*, a network B master class manager 402*b*, and a network C master class manager 402*c*. Network A class A manager 401*a* and network A class B manager 401*b* interact with network A master class manager 402*a*. Network B class A manager 401*c* and network B class B manager 401*d* interact with network B master class manager 402*b*. Network C class A manager 401*e* and network C class B manager 401*f* interact with network C master class manager 402*c*. Thus, the exemplary embodiment of FIG. 4 include three ISPs.

Second tier coordinator 404 may include a plurality of sub-modules 410, a communication interface 412, a memory 414, and a processor 416. Different and additional components may be incorporated into second tier coordinator 404. For example, second tier coordinator 404 may include a display and/or an input interface to facilitate user interaction with the plurality of sub-modules 410. Communication interface 412 provides an interface for receiving and transmitting data between devices using various protocols, transmission technologies, and media that may be wired or wireless as known to those skilled in the art. Second tier coordinator 404 may include a plurality of communication interfaces that use the same or a different transmission technology and/or transmission media. Memory 414 is an electronic holding place or storage for information so that the information can be accessed by processor 416 as known to those skilled in the art. Second tier coordinator 404 may include one or more memories that use the same or a different memory technology. Processor 416 executes instructions as known to those skilled in the art and discussed previously with reference to processor 138 shown with reference to FIG. 1. Second tier coordinator 404 may include a plurality of processors that use the same or a different processing technology.

The plurality of sub-modules 410 may be implemented using one or more computing device. If the plurality of sub-modules 410 are implemented in different computing devices, each computing device may include a communication interface, memory, and/or processor. Thus, the plurality of sub-modules 410 may be implemented in a single computing device, in a single location, in a single facility, and/or may be remote from one another. The plurality of sub-modules 410 may include a classification manager 418, a classification index manager 420, a feedback receiver 422, and a route assignor 424. The plurality of sub-modules 410 perform operations associated with optimizing the provision of traffic and travel time information services based on the class of each user. The operations may be implemented using hardware, firmware, software, or any combination of these methods.

With reference to FIG. 4, the plurality of sub-modules 410 of second tier coordinator 404 may include classification manager 418, classification index manager 420, feedback receiver 422, and route assignor 424. Classification manager 418 re-defines the classification of the traveler in conjunction with the information from other users from all of the ISPs, for example networks A, B, and C. Classification index manager 420 builds a conversion index to translate a user classification of master system manager 408 into the user classification for all ISPs. Any feedback from ISPs is received by feedback receiver 422. Specifically, user compliance information for each ISP is useful for master system manager 408 to estimate and to predict the best travel time and dynamic routing information for all classes of users and all of the ISPs.

Second tier coordinator 404 manages travel time and traffic information delivery for network A master class manager 402*a*, network B master class manager 402*b*, and network C master class manager 402*c*. Second tier coordinator 404 assigns different sets of best routes to the various ISPs. For example, second tier coordinator 404 may assign two best routes to Google and another two best routes to Verizon Wireless for the same origin-destination at the same time interval. Network A master class manager 402*a*, network B master class manager 402*b*, and network C master class manager 402*c* function as the information receivers and feedback providers in such a scenario. Based on its own business operating mechanism, network A master class manager 402*a*, network B master class manager 402*b*, and network C master class manager 402*c* manage travel time, traffic, and dynamic routing information delivery for its end users who subscribe to the ISP service.

Figure 5:
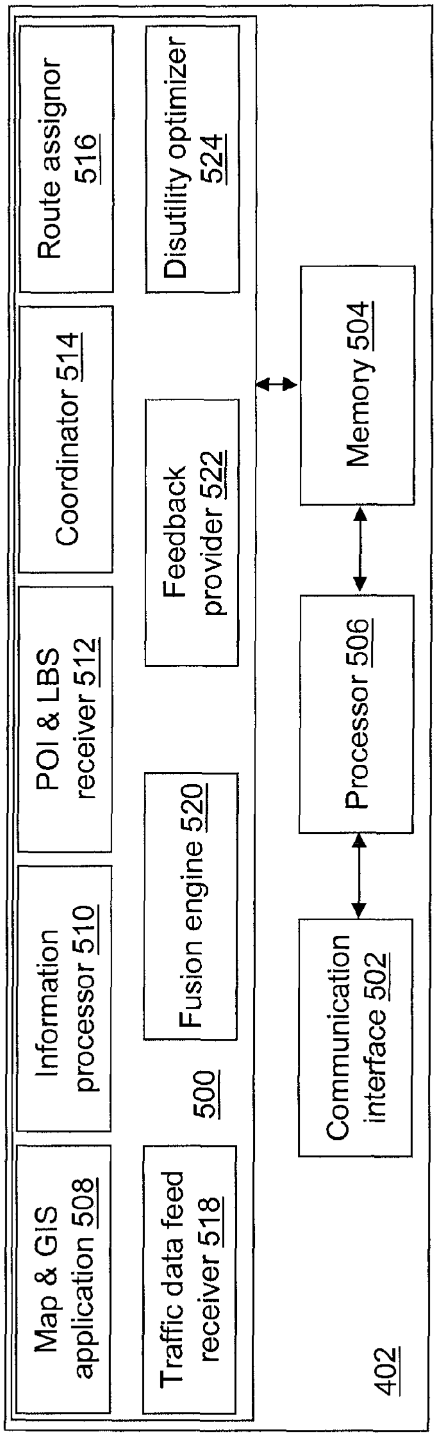
FIG. 5 depicts a block diagram of a network class manager of the traffic management system of FIG. 4 in accordance with an exemplary embodiment.

With reference to FIG. 5, a network master class manager 402 may include a plurality of sub-modules 500, a communication interface 502, a memory 504, and a processor 506. Network A master class manager 402*a*, network B master class manager 402*b*, and network C master class manager 402*c* are each examples of network master class manager 402. Different and additional components may be incorporated into network master class manager 402. The plurality of sub-modules 500 may be implemented using one or more computing device. If the plurality of sub-modules 500 are implemented in different computing devices, each computing device may include a communication interface, memory, and/or processor. Thus, the plurality of sub-modules 500 may be implemented in a single computing device, in a single location, in a single facility, and/or may be remote from one another. The plurality of sub-modules 500 may include a map and GIS application 508, an information processor 510, a POI and LBS receiver 512, a coordinator 514, a route assignor 516, a traffic data feed receiver 518, a fusion engine 520, a feedback provider 522, and a disutility optimizer 524. The plurality of sub-modules 600 perform operations associated with managing travel time, traffic, and dynamic routing information delivery for its end users who subscribe to the ISP service. The operations may be implemented using hardware, firmware, software, or any combination of these methods. For each ISP network, network master class manager 402 receives dynamic route and travel plan information from second tier coordinator 404. Network master class manager 402 refines the dynamic route and travel plan information with its own user classification and traffic information generation.

Figure 6:
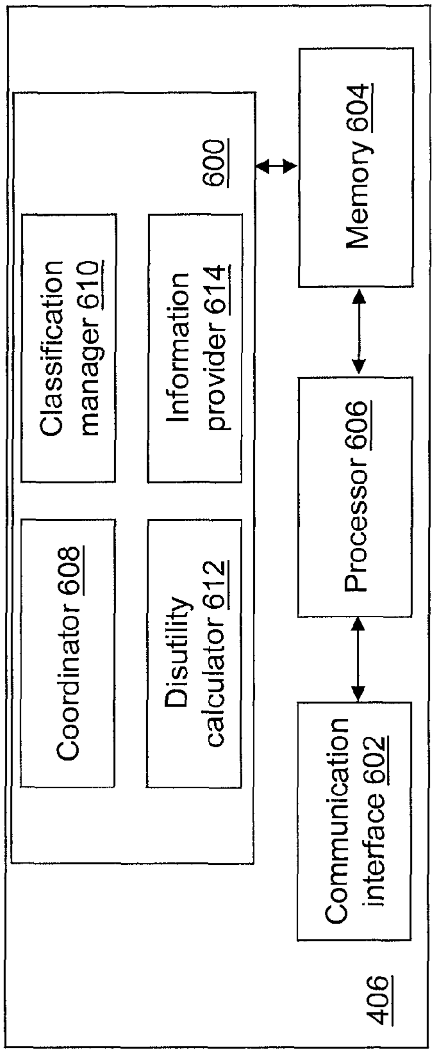
FIG. 6 depicts a block diagram of a second tier class manager of the traffic management system of FIG. 4 in accordance with an exemplary embodiment.

With reference to the exemplary embodiment of FIG. 4, the plurality of second tier class managers includes a second tier class A manager 406*a*, a second tier class B manager 406*b*, a second tier class C manager 406*c*, and a second tier class D manager 406*d*. With reference to FIG. 6, a second tier class manager 406 may include a plurality of sub-modules 600, a communication interface 602, a memory 604, and a processor 606. Communication interface 602 provides an interface for receiving and transmitting data between devices using various protocols, transmission technologies, and media that may be wired or wireless as known to those skilled in the art. Second tier class manager 406 may include a plurality of communication interfaces that use the same or a different transmission technology and/or transmission media. Memory 604 is an electronic holding place or storage for information so that the information can be accessed by processor 606 as known to those skilled in the art. Second tier class manager 406 may include one or more memories that use the same or a different memory technology. Processor 606 executes instructions as known to those skilled in the art and discussed previously with reference to processor 138 shown with reference to FIG. 1. Second tier class manager 406 may include a plurality of processors that use the same or a different processing technology. Second tier class A manager 406*a*, second tier class B manager 406*b*, second tier class C manager 406*c*, and second tier class D manager 406*d* are each examples of second tier class manager 406. Different and additional components may be incorporated into second tier class manager 406.

The plurality of sub-modules 600 may be implemented using one or more computing device. If the plurality of sub-modules 600 are implemented in different computing devices, each computing device may include a communication interface, memory, and/or processor. Thus, the plurality of sub-modules 600 may be implemented in a single computing device, in a single location, in a single facility, and/or may be remote from one another. The plurality of sub-modules 600 may include a coordinator 608, a classification manager 610, a disutility calculator 612, and information provider 614. Coordinator 608 interacts with master system manager 408. Classification manager 610 handles user registration information and classifies users based on the rules of master system manager 408. The plurality of sub-modules 600 perform operations associated with generating and managing traffic and travel time information for each class of users. The operations may be implemented using hardware, firmware, software, or any combination of these methods.

Figure 7:
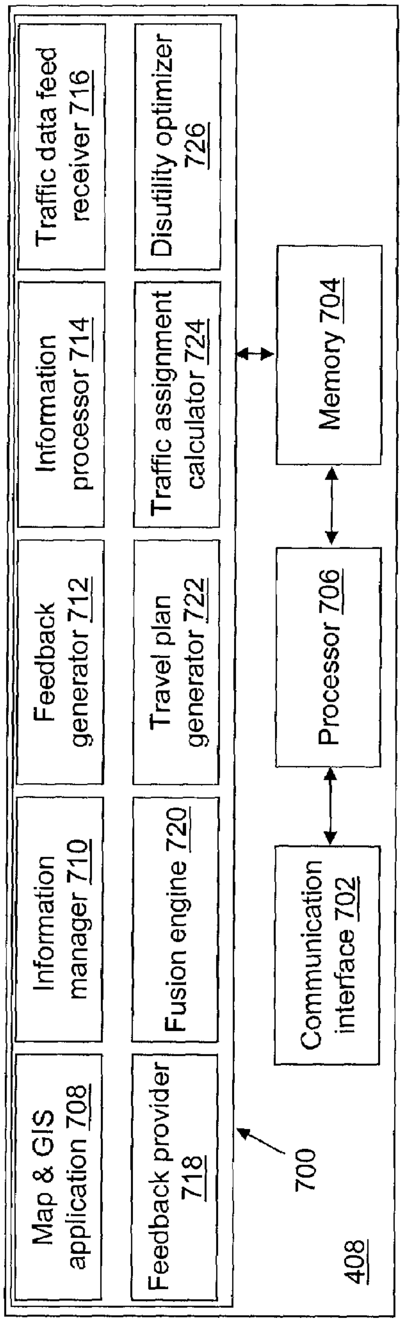
FIG. 7 depicts a block diagram of a system coordinator of the traffic management system of FIG. 4 in accordance with an exemplary embodiment.

As shown with reference to FIG. 7, master system manager 408 may include a plurality of sub-modules 700, a communication interface 702, a memory 704, and a processor 706. Different and additional components may be incorporated into master system manager 408. For example, master system manager 408 may include a display and/or an input interface to facilitate user interaction with the plurality of sub-modules 700. Communication interface 702 provides an interface for receiving and transmitting data between devices using various protocols, transmission technologies, and media that may be wired or wireless as known to those skilled in the art. Master system manager 408 may include a plurality of communication interfaces that use the same or a different transmission technology and/or transmission media. If master system manager 408 and the plurality of second tier class managers are implemented in different computing devices, communication interface 702 may support the exchange of data between master system manager 408 and the plurality of second tier class managers.

Master system manager 408, second tier class A manager 406*a*, second tier class B manager 406*b*, second tier class C manager 406*c*, second tier class D manager 406*d*, and/or second tier coordinator 404 may be integrated in one or more computing devices. As a result, master system manager 408, second tier class A manager 406*a*, second tier class B manager 406*b*, second tier class C manager 406*c*, second tier class D manager 406*d*, and/or second tier coordinator 404 may or may not include separate communication interfaces, separate memories, and separate processors.

Memory 704 is an electronic holding place or storage for information so that the information can be accessed by processor 706 as known to those skilled in the art. Master system manager 408 may include one or more memories that use the same or a different memory technology. Processor 706 executes instructions as known to those skilled in the art and discussed previously with reference to processor 138 shown with reference to FIG. 1. Master system manager 408 may include a plurality of processors that use the same or a different processing technology.

The plurality of sub-modules 700 may be implemented using one or more computing device. If the plurality of sub-modules 700 are implemented in different computing devices, each computing device may include a communication interface, memory, and/or processor. Thus, the plurality of sub-modules 700 may be implemented in a single computing device, in a single location, in a single facility, and/or may be remote from one another. The plurality of sub-modules 700 may include a map and GIS application 708, an information manager 710, a feedback generator 712, an information processor 714, a traffic data feed receiver 716, a feedback provider 718, a traffic data fusion engine 720, a travel plan generator 722, a traffic assignment calculator 724, and a disutility optimizer 726. The plurality of sub-modules 700 perform operations associated with optimizing the provision of traffic and travel time information services based on the class of each user. The operations may be implemented using hardware, firmware, software, or any combination of these methods.

Information processor 714 handles the information processing specific for the master system manager 408, including information coverage, update frequency, and background information. Information manager 710 re-groups all users from all associated ISP networks into new classes based on similar classification schemes used by the ISP networks. Subsequently, a classification index is created to convert the classification of master system manager 408 to the classification of all associated ISP networks, i.e., networks A, B, C. When each ISP network deals with its end users, the ISP network may use a different classification system. To coordinate with master system manager 408 for travel time, traffic, and dynamic routing information generation purposes, the ISP network uses pre-defined user classifications and a classification index. Furthermore, information manager 710 stores and manages all demographic and user behavior information for all end users. The demographic and user behavior information is used by traffic assignment calculator 724, disutility optimizer 726, and travel plan generator 722.

Feedback generator 712 produces feedback information for all of the ISP networks, including consistency of user classification. Map and GIS application 708 provides the basis for operating traffic assignment calculator 724, disutility optimizer 726, and travel plan generator 722. In other words, digital maps enable dynamic route calculation. Traffic data feed receiver 716 receives historical, real-time, and predictive traffic data from vendors. Traffic data fusion engine 720 fuses and integrates the traffic data from multiple sources into one dataset. Feedback provider 718 sends feedback information including traffic volume and accuracy to traffic data vendors to help vendors refine their traffic data and modeling.

As the core module, traffic assignment calculator 724 implements a bi-level problem to find the optimal travel time and dynamic routing solutions for the traffic and travel time information system for master system manager 408. Disutility optimizer 726 optimizes end user travel disutilities for each class of users classified by master system manager 408. Travel plan generator 722 produces a set of dynamic routes and dynamic travel plans for each class of users at each time interval. The bi-level problem is defined below with reference to equations (8)-(14). Specifically, for each class j at any time interval, the objective of master system manager 408 is to minimize the travel disutility between each origin-destination regardless of user classification and ISP association, i.e. to minimize $$\pi_j^{rs}(t) \tag{8}$$

$$\text{subject to } \pi_j^{rs}(t) \geqq \pi_{j-1}^{rs}(t) \forall r,s,j \tag{9}$$

$$\text{and } \pi_{ij}^{rs}(t) \geqq \pi_j^{rs}(t) \forall r,s,i,j \tag{10}$$

if master system manager 408 chooses or recommends routes for a traveler i at time t, $$\pi_{ij}^{rs}(t) = \pi_j^{rs}(t) \forall r,s,i,j \tag{11}$$

and network flow constraints where $\pi_{ij}^{rs}(t)$ is the travel disutility for traveler i in new class j (defined by master system manager 408) departing origin r at time t toward destination s and $\pi_j^{rs}(t)$ is the minimum travel disutility for users in new class j departing origin r at time t toward destination s.

As noted in equation (9), the travel disutility for new class j is greater than or equal to the travel disutility for new class j−1 (j=2, 3, 4, . . . , N). New class 1 users have the lowest travel disutility among all classes within the jurisdiction of master system manager 408. As noted in equations (10)-(11), when master system manager 408 finds and suggests a route for traveler i in new class j, the travel disutility for traveler i is equal to the travel disutility for all users in new class j receiving best route recommendations from master system manager 408. For example, if travel disutility is simply represented by travel time, equation (9) ensures that new class 1 users have the lowest travel time routes, and new class 2 users have lower travel time routes than class 3 users, etc. Equations (10)-(11) ensure that all users in new class 1 receive dynamic routing suggestions which have equal and minimum travel times.

The operating system of master system manager 408 is to ensure the above information provision criterion or principle is satisfied. Accordingly, traffic assignment calculator 724 is designed to follow the above principle. On the other hand, for all users in new class j at any time interval, the objective of master system manager 408 is to minimize the travel disutility between each origin-destination, i.e., to minimize $$\pi_{ij}^{rs}(t) \tag{12}$$

$$\text{subject to } \pi_{ijp}^{rs}(t) \geqq \pi_{ij}^{rs}(t) \forall r,s,i,j,p \tag{13}$$

if master system manager 408 chooses or recommends routes p for a traveler i at time t, $$\pi_{ijp}^{rs}(t) = \pi_{ij}^{rs}(t) \forall r,s,i,j,p \tag{14}$$

and network flow constraints where $\pi_{ijp}^{rs}(t)$ is the travel disutility for traveler i in new class j (defined by master system manager 408) departing origin r at time t toward destination s via route p and $\pi_{ij}^{rs}(t)$ is the travel disutility for traveler i in new class j departing origin r at time t toward destination s.

As noted in equations (13)-(14), when master system manager 408 finds and suggests route p for traveler i in new class j, the travel disutility on route p for traveler i is equal to the minimum travel disutility from origin r to destination s at time interval t regardless of to which ISP the user belongs. With the coordination of master system manager 408, each ISP's functions are refined. Equations (8)-(14) may be solved in a similar manner as outlined with reference to equations (1)-(7).

Figure 8:
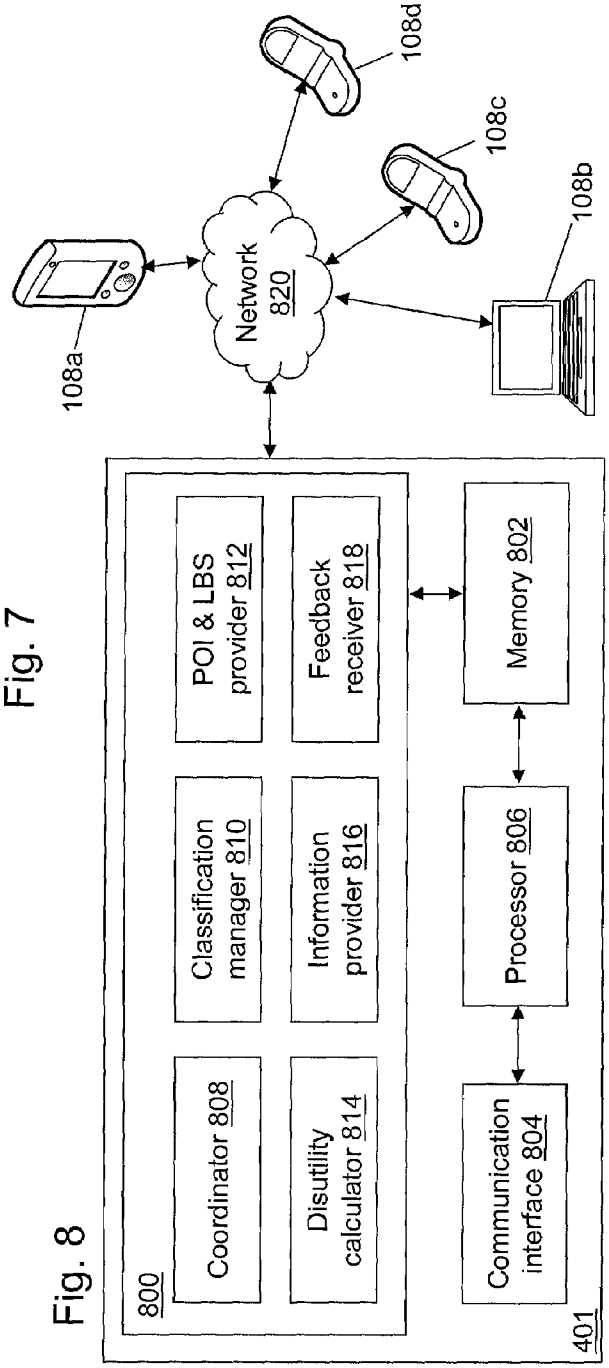
FIG. 8 depicts a block diagram of a first network class manager of the traffic management system of FIG. 4 in accordance with an exemplary embodiment.

With reference to FIG. 8, a network class manager 401 may include a plurality of sub-modules 800, a communication interface 802, a memory 804, and a processor 806. Network A class A manager 401*a*, a network A class B manager 401*b*, a network B class A manager 401*c*, a network B class B manager 401*d*, a network C class A manager 401*e*, and a network C class B manager 401*f* are each examples of network class manager 401. Different and additional components may be incorporated into network class manager 401. The plurality of sub-modules 800 may be implemented using one or more computing device. If the plurality of sub-modules 800 are implemented in different computing devices, each computing device may include a communication interface, memory, and/or processor. Thus, the plurality of sub-modules 800 may be implemented in a single computing device, in a single location, in a single facility, and/or may be remote from one another.

The plurality of sub-modules 800 may include a coordinator 808, a classification manager 810, a POI and LBS provider 812, a disutility calculator 814, an information provider 816, and a feedback receiver 818. The plurality of sub-modules 800 perform operations associated with completing the user information gathering and information delivery for its own individual users. The operations may be implemented using hardware, firmware, software, or any combination of these methods. An end user can make dynamic travel decisions based on their own calculation of travel disutility. The travel disutility for traveler i can be determined by traveler i based on the formulae provided by an ISP. The travel disutility information can be stored on a computing device, such as an in-vehicle navigation system, a mobile device such as a wireless phone, a computer of any form factor including a desktop, laptop, and pocket computer, an Apple™ iPod, etc. Additionally, the travel disutility information can be stored on a server managed by the ISP or a password protected public site. A user may update the travel disutility function and conduct calibration of the travel disutility function based on personal driving and travel experiences. Therefore, disutility calculator 612 performs such a function to help the traveler make their dynamic travel choice decisions.

By interacting with travel plan generator 722, information provider 614 provides dynamic route and travel plan information as well as personalized, route-specific travel time and traffic information for all ISPs so that each ISP can customize such information and provide to its users. Subsequently, route assignor 424 of second tier coordinator 404 takes over such information and generates appropriate dynamic route assignments for each ISP. A traveler subscribes to the travel time and traffic information service of an ISP (network). The network class manager 401 to which the user subscribes uses classification manager 810 to collect the basic demographic information and travel preference information. Moreover, disutility calculator 814 is used by the traveler to customize the parameters based on the input of the traveler to calculate a personalized travel disutility. Subsequently, coordinator 808 sends such user information to the network master class manager 402 to which the user subscribes for further processing.

Moreover, coordinator 514 of network master class manager 402 receives all the user information from coordinator 808 of network class manager 401. At this stage, two processes may occur. The first process is to send all of the user information to second tier coordinator 404. The second process is to use route assignor 516 of network master class manager 402 to produce personalized, route-specific travel time and traffic information. Preferably, the second process waits until the first process is complete and sends back the dynamic routing information produced by route assignor 424 of second tier coordinator 404.

At master system manager 408, travel plan generator 722 receives the predicted best travel time and dynamic routing information from traffic assignment calculator 724 and produces a set of best dynamic route and travel plans for the ISP to which the user subscribes. Subsequently, route assignor 516 of network master class manager 402 produces dynamic routing and traffic information for each class of users, including the user. Then, information provider 816 of network class manager 401 presents the user with personalized, route-specific travel time and traffic information as well as dynamic routing information. POI and LBS provider 812 of network class manager 401 adds related POI and LBS information for routes assigned to the user. The user uses their own mobile device or navigation device to receive the personalized, route-specific travel time and traffic information from information provider 816 of network class manager 401. Any feedback from the traveler will be received by feedback receiver 818 of network class manager 401. Because the user may or may not rely on the travel time and traffic information as well as routing information from information provider 816 of network class manager 401 to make their own travel decisions. Such feedback is useful for traffic assignment calculator 724 of master system manager 408 to make a better estimation and prediction for travel time and coordinated routing.

The word "exemplary" is used herein to mean serving as an example, instance, or illustration. Any aspect or design described herein as "exemplary" is not necessarily to be construed as preferred or advantageous over other aspects or designs. Further, for the purposes of this disclosure and unless otherwise specified, "a" or "an" means "one or more".

The exemplary embodiments may be implemented as a method, apparatus, or article of manufacture using standard programming and/or engineering techniques to produce software, firmware, hardware, or any combination thereof to control a computer to implement the disclosed embodiments. The term "computer readable medium" can include, but is not limited to, magnetic storage devices (e.g., hard disk, floppy disk, magnetic strips, . . . ), optical disks (e.g., compact disk (CD), digital versatile disk (DVD), . . . ), smart cards, flash memory devices, etc. Additionally, it should be appreciated that a carrier wave can be employed to carry computer-readable media such as those used in transmitting and receiving electronic mail or in accessing a network such as the Internet or a local area network (LAN).

The foregoing description of exemplary embodiments of the invention have been presented for purposes of illustration and of description. It is not intended to be exhaustive or to limit the invention to the precise form disclosed, and modifications and variations are possible in light of the above teachings or may be acquired from practice of the invention. The functionality described may be implemented in a single executable or application or may be distributed among modules that differ in number and distribution of functionality from those described herein. Additionally, the order of execution of the functions may be changed depending on the embodiment. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A device for assigning routes for a plurality of users allocated to different classes, the system comprising:

a computer-readable medium having computer-readable instructions stored therein, the instructions comprising
 identifying a first group of users based on a user classification, wherein each user of the first group of users has a first user classification;
 identifying a second group of users based on the user classification, wherein each user of the second group of users has a second user classification, wherein the first user classification is different from the second user classification;

calculating a disutility value for each user of the first group of users and for each user of the second group of users using a travel disutility function based on an origin and a destination of each user of the first group of users and each user of the second group of users;

executing a bi-level problem solver to optimize the disutility value based on the user classification; and recommending a route to each user of the first group of users and to each user of the second group of users based on the bi-level problem execution;

a communication interface, the communication interface sending the recommended route to each user of the first group of users and to each user of the second group of users; and a processor, the processor coupled to the communication interface and to the computer-readable medium and configured to execute the instructions.

2. The device of claim 1, wherein the travel disutility function is defined for each user of the first group of users and for each user of the second group of users.

3. The device of claim 1, wherein the user classification is based on one or more factor selected from the group consisting of a subscription fee, a transaction fee, a length of membership, a sponsorship, an advertisement income, a seniority ranking, and a service provider of the user.

4. The device of claim 1, wherein the bi-level problem solver comprises:

minimizing $\pi_j^{rs}(t)$ subject to $\pi_j^{rs}(t) \geqq \pi_{j-1}^{rs}(t)$ $\forall$r, s, j and $\pi_{ij}^{rs}(t) \geqq \pi_j^{rs}(t)$ $\forall$r, s, i, j where $\pi_j^{rs}(t)$ is a minimum travel disutility for users in a user classification j departing an origin r at a time t toward a destination s and $\pi_{ij}^{rs}(t)$ is a travel disutility for a traveler i in the user classification j departing the origin r at the time t toward the destination s; and minimizing $\pi_{ij}^{rs}(t)$ subject to $\pi_{ijp}^{rs}(t) \geqq \pi_{ij}^{rs}(t)$ $\forall$r, s, i, j, p where $\pi_{ijp}^{rs}(t)$ is the travel disutility for traveler i in class j departing origin r at time t toward destination s via route p and $\pi_{ij}^{rs}(t)$ is the minimum travel disutility for users i in class j departing origin r at time t toward destination s.

5. The device of claim 1, wherein executing the bi-level problem solver comprises:

determining first routes for each user of the first group of users and second routes for each user of the second group of users based on a minimum travel disutility assuming free-flow traffic conditions;

assigning routes to each user of the second group of users based on the determined second routes;

loading a traffic network with traffic flow based on the assigned routes;

determining third routes for each user of the second group of users based on a minimum travel disutility considering the loaded traffic network;

assigning fourth routes to each user of the second group of users based on the determined third routes;

loading the traffic network with traffic flow based on the assigned fourth routes;

determining fifth routes for each user of the first group of users based on the minimum travel disutility considering the traffic network loaded based on the assigned fourth routes; and assigning sixth routes to each user of the first group of users based on the determined fifth routes.

6. The device of claim 1, wherein the calculated travel disutility for each user of the first group of users is less than or equal to the calculated travel disutility for each user of the second group of users.

7. A non-transitory computer-readable medium having computer-readable instructions therein that, upon execution by a processor, cause the processor to assign routes for a plurality of users allocated to different classes, the instructions comprising:

identifying a first group of users based on a user classification, wherein each user of the first group of users has a first user classification;

identifying a second group of users based on the user classification, wherein each user of the second group of users has a second user classification, wherein the first user classification is different from the second user classification;

calculating a disutility value for each user of the first group of users and for each user of the second group of users using a travel disutility function based on an origin and a destination of each user of the first group of users and each user of the second group of users;

executing a bi-level problem solver to optimize the disutility value based on the user classification; and recommending a route to each user of the first group of users and to each user of the second group of users based on the bi-level problem execution.

8. The non-transitory computer-readable medium of claim 7, wherein the travel disutility function is defined for each user of the first group of users and for each user of the second group of users.

9. The non-transitory computer-readable medium of claim 7, wherein the user classification is based on one or more factor selected from the group consisting of a subscription fee, a transaction fee, a length of membership, a sponsorship, an advertisement income, a seniority ranking, and a service provider of the user.

10. The non-transitory computer-readable medium of claim 7, wherein the bi-level problem solver comprises:

minimizing $\pi_j^{rs}(t)$ subject to $\pi_j^{rs}(t) \geqq \pi_{j-1}^{rs}(t)$ $\forall$r, s, j and $\pi_{ij}^{rs}(t) \geqq \pi_j^{rs}(t)$ $\forall$r, s, i, j where $\pi_j^{rs}(t)$ is a minimum travel disutility for users in a user classification j departing an origin r at a time t toward a destination s and $\pi_{ij}^{rs}(t)$ is a travel disutility for a traveler i in the user classification j departing the origin r at the time t toward the destination s; and minimizing $\pi_{ij}^{rs}(t)$ subject to $\pi_{ijp}^{rs}(t) \geqq \pi_{ij}^{rs}(t)$ $\forall$r, s, i, j, p where $\pi_{ijp}^{rs}(t)$ is the travel disutility for traveler i in class j departing origin r at time t toward destination s via route p and $\pi_{ij}^{rs}(t)$ is the minimum travel disutility for users i in class j departing origin r at time t toward destination s.

11. The non-transitory computer-readable medium of claim 7, wherein executing the bi-level problem solver comprises:

determining first routes for each user of the first group of users and second routes for each user of the second group of users based on a minimum travel disutility assuming free-flow traffic conditions;

assigning routes to each user of the second group of users based on the determined second routes;

loading a traffic network with traffic flow based on the assigned routes;

determining third routes for each user of the second group of users based on a minimum travel disutility considering the loaded traffic network;

assigning fourth routes to each user of the second group of users based on the determined third routes;

loading the traffic network with traffic flow based on the assigned fourth routes;

determining fifth routes for each user of the first group of users based on the minimum travel disutility considering the traffic network loaded based on the assigned fourth routes; and assigning sixth routes to each user of the first group of users based on the determined fifth routes.

12. The non-transitory computer-readable medium of claim 7, wherein the calculated travel disutility for each user of the first group of users is less than or equal to the calculated travel disutility for each user of the second group of users.

13. A method of assigning routes for a plurality of users allocated to different classes, the method comprising:

identifying a first group of users based on a user classification, wherein each user of the first group of users has a first user classification;

identifying a second group of users based on the user classification, wherein each user of the second group of users has a second user classification, wherein the first user classification is different from the second user classification;

calculating a disutility value for each user of the first group of users and for each user of the second group of users using a travel disutility function based on an origin and a destination of each user of the first group of users and each user of the second group of users;

executing a bi-level problem solver to optimize the disutility value based on the user classification; and recommending a route to each user of the first group of users and to each user of the second group of users based on the bi-level problem execution.

14. The method of claim 13, wherein the travel disutility function is defined for each user of the first group of users and for each user of the second group of users.

15. The method of claim 13, wherein the user classification is based on one or more factor selected from the group consisting of a subscription fee, a transaction fee, a length of membership, a sponsorship, an advertisement income, a seniority ranking, and a service provider of the user.

16. The method of claim 13, wherein the bi-level problem solver comprises:

minimizing $\pi_j^{rs}(t)$ subject to $\pi_j^{rs}(t) \geqq \pi_{j-1}^{rs}(t)$ $\forall$r, s, j and $\pi_{ij}^{rs}(t) \geqq \pi_j^{rs}(t)$ $\forall$r, s, i, j where $\pi_j^{rs}(t)$ is a minimum travel disutility for users in a user classification j departing an origin r at a time t toward a destination s and $\pi_{ij}^{rs}(t)$ is a travel disutility for a traveler i in the user classification j departing the origin r at the time t toward the destination s; and minimizing $\pi_{ij}^{rs}(t)$ subject to $\pi_{ijp}^{rs}(t) \geqq \pi_{ij}^{rs}(t)$ $\forall$r, s, j, p where $\pi_{ijp}^{rs}(t)$ is the travel disutility for traveler i in class j departing origin r at time t toward destination s via route p and $\pi_{ij}^{rs}(t)$ is the minimum travel disutility for users i in class j departing origin r at time t toward destination s.

17. The method of claim 13, wherein executing the bi-level problem solver comprises:

determining first routes for each user of the first group of users and second routes for each user of the second group of users based on a minimum travel disutility assuming free-flow traffic conditions;

assigning routes to each user of the second group of users based on the determined second routes;

loading a traffic network with traffic flow based on the assigned routes;

determining third routes for each user of the second group of users based on a minimum travel disutility considering the loaded traffic network;

assigning fourth routes to each user of the second group of users based on the determined third routes;

loading the traffic network with traffic flow based on the assigned fourth routes;

determining fifth routes for each user of the first group of users based on the minimum travel disutility considering the traffic network loaded based on the assigned fourth routes; and assigning sixth routes to each user of the first group of users based on the determined fifth routes.

18. The method of claim 13, wherein the calculated travel disutility for each user of the first group of users is less than or equal to the calculated travel disutility for each user of the second group of users.

* * * * *